United States Patent
Takemura et al.

(10) Patent No.: US 6,917,189 B2
(45) Date of Patent: Jul. 12, 2005

(54) ELECTRIC POWER SUPPLY UNIT HAVING IMPROVED OUTPUT VOLTAGE RESPONSE

(75) Inventors: Ko Takemura, Kyoto (JP); Kiyotaka Umemoto, Kyoto (JP); Kenichi Nakata, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 85 days.

(21) Appl. No.: 10/424,079

(22) Filed: Apr. 25, 2003

(65) Prior Publication Data

US 2003/0210022 A1 Nov. 13, 2003

(30) Foreign Application Priority Data

May 13, 2002 (JP) ........................................ 2002-137138

(51) Int. Cl.[7] ................................................ G05F 1/40
(52) U.S. Cl. ........................ 323/284; 323/288; 323/316; 323/280
(58) Field of Search ................................ 323/222, 225, 323/315, 316, 280, 281, 282, 284, 288, 351

(56) References Cited

U.S. PATENT DOCUMENTS 5,845,190 A  * 12/1998  Bushue et al. .............. 323/282
6,088,251 A  *  7/2000  Fedan ........................ 323/351

FOREIGN PATENT DOCUMENTS

JP          10-098874          4/1998

* cited by examiner

*Primary Examiner*—Jessica Han
(74) *Attorney, Agent, or Firm*—Hogan & Hartson LLP (57) ABSTRACT

The power supply unit is provided with a power supply circuit adapted to generate an output voltage in accord with an instruction voltage, an output condenser Co connected to the output end of the power supply circuit, and an auxiliary output voltage setting circuit adapted to compare the instruction voltage and the output voltage and to cause the output condenser to discharge its electric charge when the instruction voltage becomes lower than the output voltage. Because of the auxiliary output voltage setting circuit, the power supply circuit quickly generates an output voltage in accord with the instruction voltage if the instruction voltage is lowered.

14 Claims, 7 Drawing Sheets

ELECTRIC POWER SUPPLY UNIT HAVING IMPROVED OUTPUT VOLTAGE RESPONSE

FIELD OF THE INVENTION

This invention relates to an electric power supply unit having improved output voltage response to a change in instruction voltage.

BACKGROUND OF THE INVENTION

Switching power supply units have been widely used as power supply units for efficiently converting a given supply voltage to a lower voltage. In order to smooth the intermittent output voltage arising from switching, a switching power supply unit has at the output end thereof a smoothing coil and an output condenser.

The smoothing coil and the output condenser will delay the output voltage if a load is suddenly changed. Thus, there has been proposed an improved power supply unit adapted to alleviate the delay in the response to a change in load, as disclosed in, for example, Japanese Patent Early Publication H10-98874.

Figure 1:
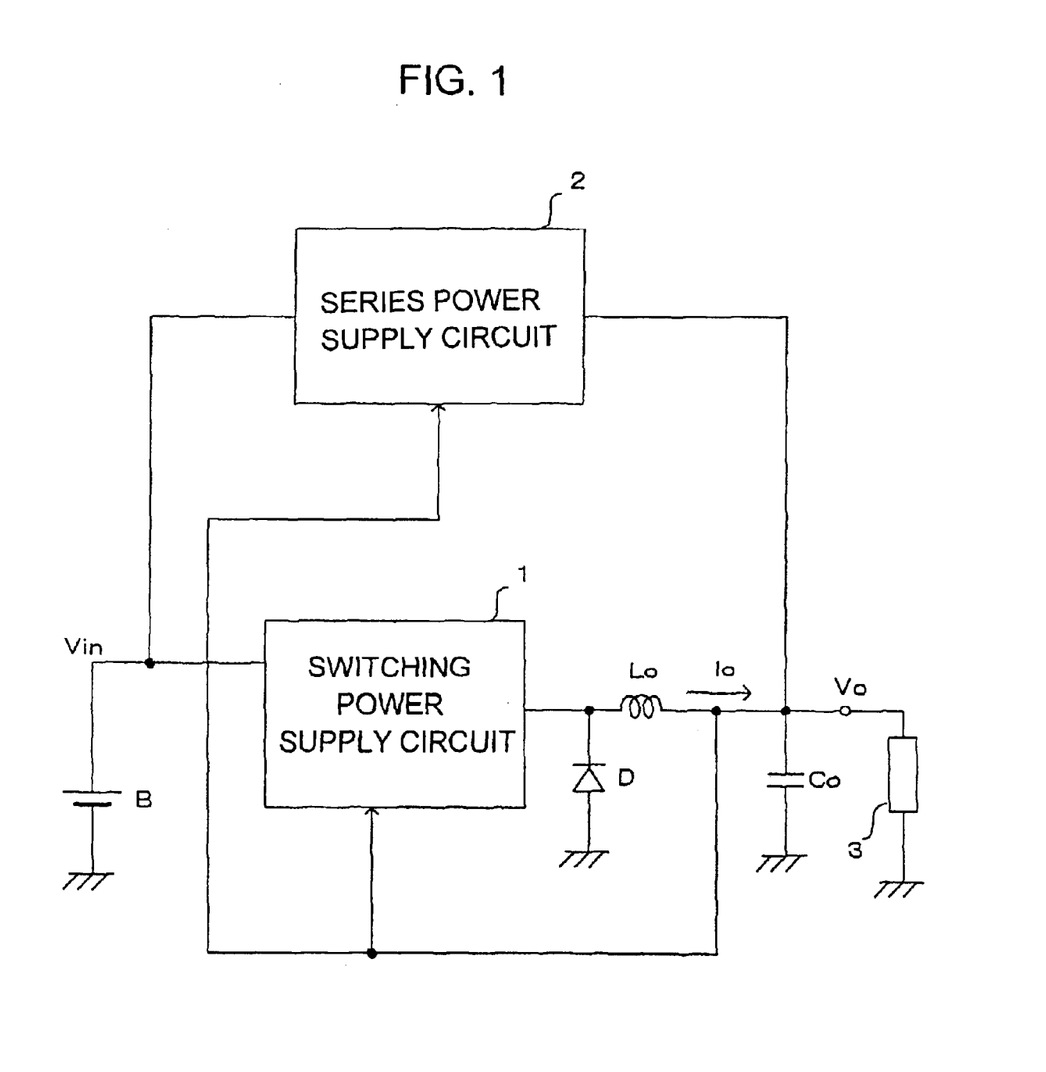
FIG. 1 is a general circuit arrangement of a conventional power supply unit.

FIG. 1 shows a general circuit arrangement of a power supply unit having an improvement in response to a delay pertinent to conventional circuits. A switching power supply circuit 1 of FIG. 1 performs switching to convert a supply voltage Vin of a power source B such as a battery into a pulsed output having a fixed pulse width, based on the comparison of the output voltage Vo with an internal reference voltage (not shown). The pulsating output is smoothed by a smoothing coil Lo and an output condenser Co, and supply a resultant output voltage Vo to a load 3. Diode D is a flywheel diode.

If this load 3 suddenly increases, the output voltage Vo is lowered. In order to compensate for the delay in recovery of the output voltage Vo back to a predetermined level, a series power supply circuit 2 is connected in parallel with the switching power supply circuit 1. Thus, when the output voltage Vo is suddenly lowered by a sudden increase of the load, a current is promptly supplied to the output condenser Co via the series power supply circuit 2, thereby recovering the output voltage Vo within a short delay time.

In this conventional electric power supply unit, the output voltage can be recovered without an appreciable delay even if a rapid change takes place in the load, provided that the power supply unit has a fixed reference voltage. However, in cases where the reference voltage is lowered to change the output voltage, the conventional electric power supply unit cannot quickly lower the output voltage because the series power supply circuit 2 has only a current-feeding capability.

Figure 2:
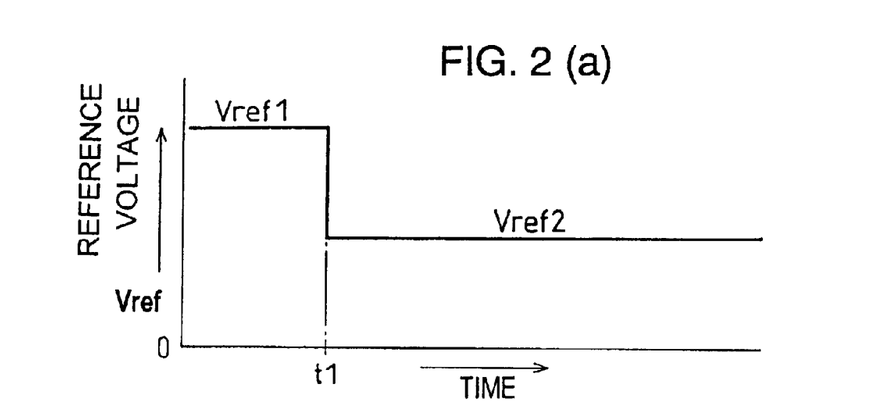
FIG. 2 shows operational characteristics of a conventional power supply unit.

FIG. 2 shows the reference voltage Vref, output voltage Vo, and load current Io changing in time during a transitional discharge. Suppose now that the reference voltage Vref is dropped from an initial level Vref1 to a final lower voltage Vref2 at time t1, as shown in FIG. 2(a). Then the current Io flowing through the smoothing coil slowly decreases as shown in FIG. 2(c), because the discharge by the load 3 is slow and that a back electromotive force is generated by the smoothing coil Lo. Consequently, the output voltage Vo sluggishly changes from its initial level Vo1 to a final level Vo2 associated with the reference voltage Vref2 over a period T2, as shown in FIG. 2(b). It is noted that the waveform of current Io shown in FIG. 2(c) corresponds to substantial switching of the output transistor of the switching power supply unit.

It is, therefore, an object of the present invention to provide a power supply unit having an output condenser, the unit adapted to change its output voltage quickly to the target voltage defined by a variable output voltage setting

SUMMARY OF THE INVENTION

In accordance with one aspect of the invention, there is provided a power supply unit, comprising:
a power supply circuit adapted to compare an instruction voltage setting a target output voltage with the feedback voltage associated with the output voltage of said power supply unit to generate the target output voltage;
an output condenser connected to the output end of the power supply circuit; and
an auxiliary output voltage setting circuit adapted to compare the instruction voltage and the feedback voltage and, when said instruction voltage is changed, to cause the output condenser to discharge its electric charge as needed based on the comparison so that the output voltage quickly follows the changed instruction voltage.

In accordance with another aspect of the invention, there is provide a power supply unit for supplying an output voltage, comprising:
a switching power supply circuit having:
series output transistors connected between a power source voltage and the ground;
a control unit for controlling the switching operations of the output transistor based on the comparison of a feedback voltage associated with the output voltage and the instruction voltage for setting the level of the output voltage; and
a smoothing coil having one end connected to the node of said series output transistors and another end outputting an switching output;
an output condenser connected to the output end of the switching power supply circuit; and
an auxiliary output voltage setting circuit adapted to compare the instruction voltage and the feedback voltage and to cause the output condenser to discharge its electric charge as needed based on the comparison, thereby permitting the output voltage to quickly follow the changed instruction voltage.

In the electric power supply unit of the invention, if the instruction voltage is altered to a lower voltage, the auxiliary output voltage setting circuit causes the output condenser to discharge its charge so that the resultant output voltage assumes the altered instruction voltage. Accordingly, the output voltage will quickly become the voltage associated with the altered instruction voltage.

It is noted that in this arrangement, the driving performance of the switching power supply circuit is high when the output voltage is raised high, and that the output voltage can be swiftly switched low when the output voltage is to be lowered, since then the output voltage is changed on the output end of the smoothing coil by the auxiliary output voltage setting circuit.

DETAILED DESCRIPTION OF THE PREFERRED EMBODIMENTS

Figure 3:
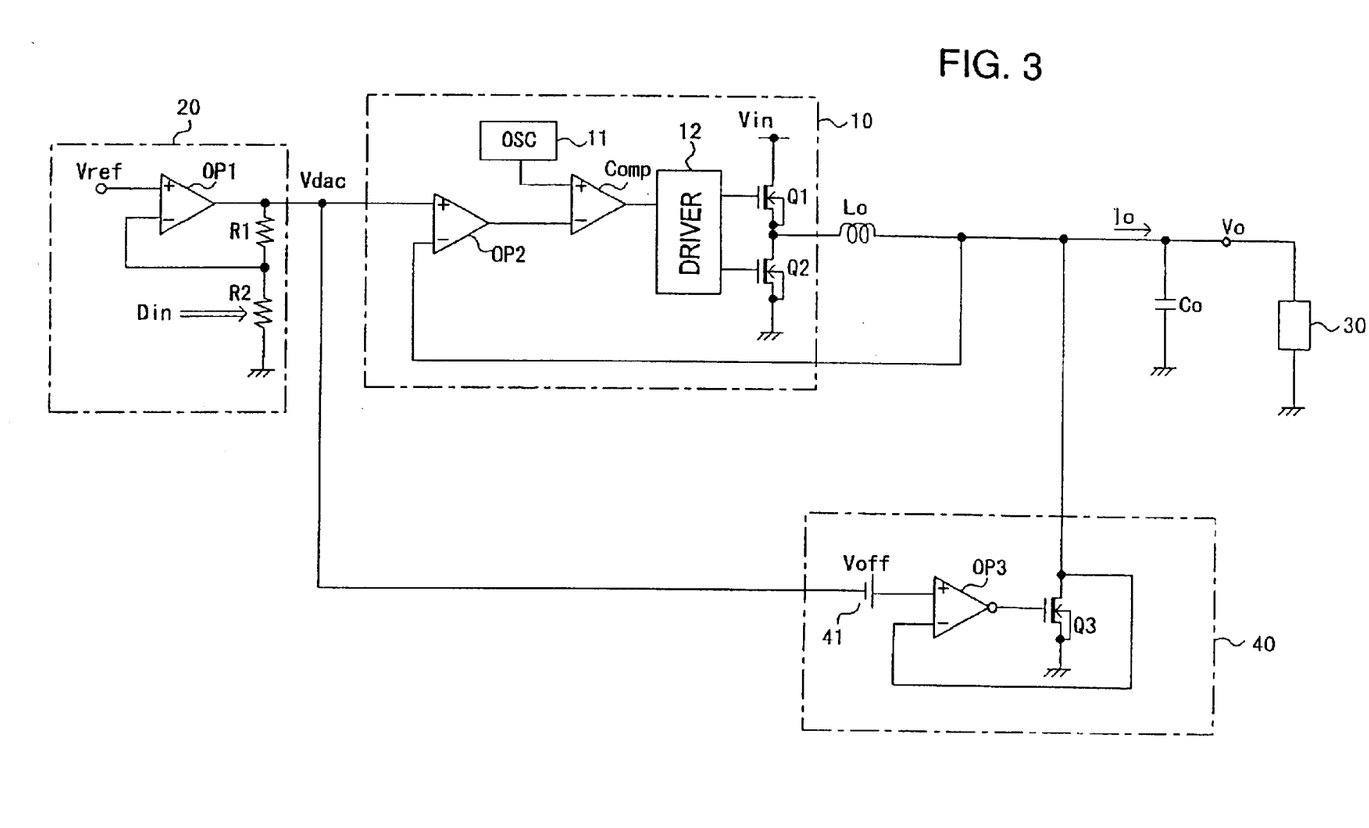
FIG. 3 is a general circuit arrangement of a first embodiment of a power supply unit according to the invention.
Figure 4:
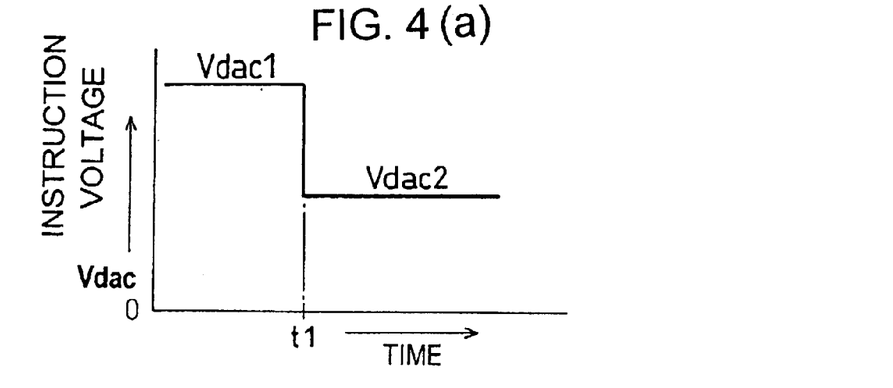
FIG. 4 shows operational characteristics of the power supply unit shown in FIG. 3.
Figure 5:
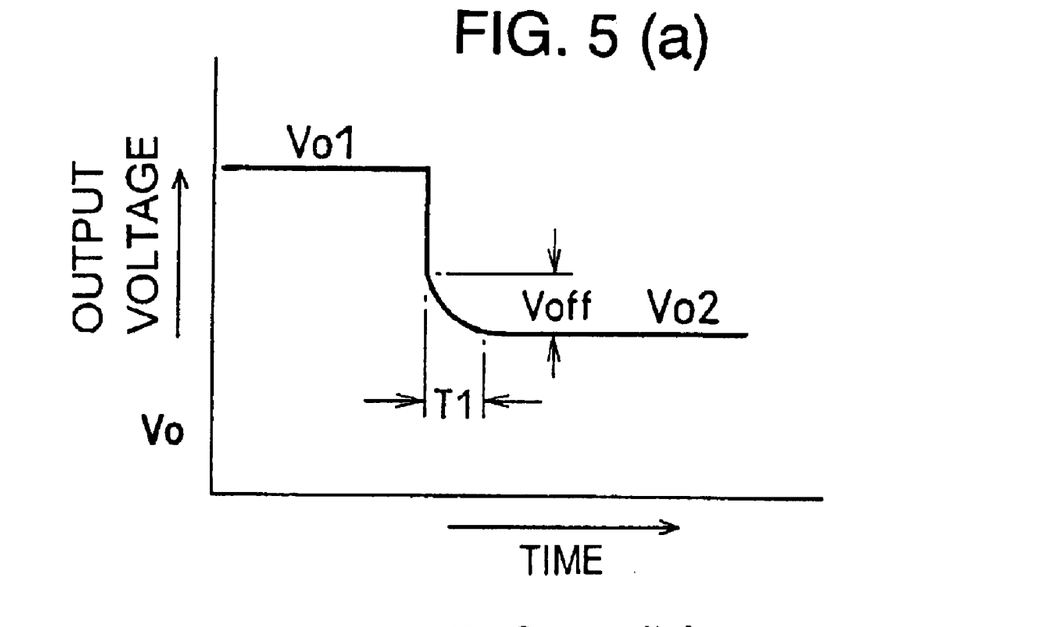
FIG. 5 illustrates the effects of an offset voltage in the power supply unit shown in FIG. 3.

FIG. 3 is a general circuit arrangement of an electric power supply unit according to a first embodiment of the invention. FIGS. 4 and 5 illustrate operations of the power supply unit.

As shown in FIG. 3, there is provided a switching DC/DC power supply circuit section 10 having a switching circuit which includes n-type MOS transistors (hereinafter referred to as n-type transistors) Q1 and Q2 connected in series between a source voltage Vin and the ground. The switching DC/DC power supply circuit section 10 also includes an error amplifier OP2, an oscillator 11, a comparator Comp, and a driver 12. The error amplifier OP2 has a non-inverting input terminal (+) for receiving an instruction voltage Vdac and an inverting terminal (−) for receiving the output voltage Vo of the power supply unit or a feedback voltage associated with the output voltage Vo. The error amplifier OP2 provides at its output terminal an amplified difference between the two input voltages.

The oscillator 11 generates a frequency triangular output signal with the high frequency (in the range from for example a few kHz to several tens kHz). The comparator Comp has a non-inverting input terminal (+) for receiving the oscillatory output of the oscillator 11 and an inverting input terminal (−) for receiving the error output of the error amplifier OP2, and supplies a resultant output to the driver 12. Based on the comparison by the comparator Comp, the driver 12 alternately switches on and off the n-type transistors Q1 and Q2 so that their on-off statuses are in opposite phase.

The output voltage of the switching circuit provided at the node of the series n-type transistors Q1 and Q2 is smoothed by the smoothing coil Lo and output condenser Co. The charging voltage of the output condenser Co is supplied as the output voltage Vo to a load 30.

An output voltage instruction circuit 20 is composed of an operational amplifier OP1, a resistor R1, and a variable resistor R2 whose resistance is varied by a digital input signal Din. A constant reference voltage Vref is supplied to the non-inverting input terminal of the operational amplifier OP1. The instruction signal Vdac is changed by changing the digital input signal Din to vary the resistance of the resistor R2.

An auxiliary output voltage setting circuit 40 is provided to allow the output condenser Co to discharge its electric charge. This auxiliary output voltage setting circuit 40 is composed of an n-type transistor Q3 connected in parallel with the output condenser Co, a comparator formed of an operational amplifier OP3 that provides an inverted output, and an offset voltage source 41 having an offset voltage Voff. The non-inverting input terminal of the operational amplifier OP3 is supplied with the instruction voltage Vdac plus the offset voltage Voff, while the inverting input terminal is supplied with the output voltage Vo, or the drain voltage of the n-type transistor Q3. The offset voltage source 41 may be connected to the non-inverting input terminal if the polarity of the offset voltage source 41 is reversed.

It should be understood that the power supply unit of the invention is not limited to the one having a switching power supply circuit. For example, the invention encompasses a power supply unit having a power supply circuit that is adapted to provide an output voltage defined by an instruction voltage input thereto by comparing the instruction voltage for setting the level of the output voltage with a feedback voltage associated with the output voltage.

Referring to FIGS. 4 and 5, operations of the power supply unit of the invention as shown in FIG. 3 will now be described below. Upon receipt of an arbitrary instruction voltage Vdac supplied from the output voltage instruction circuit 20, the error amplifier OP2 of the switching DC/DC power supply circuit section 10 calculates the difference between the instruction voltage Vdac and the output voltage Vo. In accordance with the difference between the output of the error amplifier OP2 (the output referred to as error output) and the output of the oscillator 11 (the output referred to as oscillator output), the driver 12 controls on-off operations (referred to as switching control) of the n-type transistors Q1 and Q2 of the switching circuit. As a result, the resultant output voltage Vo in accord with the instruction voltage Vdac is supplied to the load 30. Thus, while the instruction voltage Vdac remains constant, the switching control is performed for the output voltage, supplying a constant output voltage to the load if the load changes.

However, there can be occasions where the instruction voltage Vdac needs to be varied in response to a request of the load. If in such a case the instruction voltage Vdac is to be changed to a higher voltage, the power supply circuit can provide a sufficient current to charge the output condenser Co, so long as the source voltage Vin is higher than the output voltage Vo, so that the output voltage Vo can be varied rather quickly in accord with the new instruction voltage. The output voltage can be varied to a higher voltage even faster by providing a series power supply circuit as is conventional.

However, it is not the case when the instruction voltage Vdac is to be changed to a lower voltage. Ordinarily, the current Io is flowing in the direction as indicated by an arrow as shown in FIG. 3. In order to lower the output voltage Vo in accord with the instruction voltage Vdac, it is necessary to have the output condenser Co discharge its electric charge.

The charge can be discharged via the load 30 and via the smoothing coil Lo and n-type transistor Q2. However, either of the two discharge routes have only a limited discharge capability, so that the output voltage can lower only slowly.

The auxiliary output voltage setting circuit 40 of invention enables a quick change in the output voltage Vo in response to the instruction voltage Vdac changing from a high to a lower voltage.

More particularly, at the moment when the instruction voltage Vdac is changed from a given voltage Vdac1 to a new lower voltage Vdac2, the output voltage Vo1 becomes higher than the sum of the instruction voltage Vdac2 and the offset voltage Voff (Vdac2+Voff). Consequently, the output voltage of the inverting type operational amplifier OP3 goes to a HIGH level, turning on the n-type transistor Q3. This turning on of the n-type transistor Q3 causes the output condenser Co to discharge quickly, resulting in a quick reduction of the output voltage Vo.

This operation will be further described in detail with additional reference to FIG. 4. Suppose that the instruction voltage Vdac is changed from a higher voltage Vdac1 to a lower voltage Vdac2 at time t1, as shown in FIG. 4(a). At this moment, the n-type transistor Q3 is promptly turned on. Since the on-resistance of the n-type transistor Q3 is extremely small as compared with the load 30 at the moment the n-type transistor Q3 is turned on, the current Io indicated in FIG. 3 flows momentarily in the opposite direction, as shown in FIG. 4(c). It is noted that there is not anything like the smoothing coil Lo that hinders the current, so that the impedance of the path is extremely small as compared to the impedance of the load. Hence, the charge of the output condenser Co is quickly discharged.

The output voltage of the operational amplifier OP3 returns to the LOW level when the output voltage Vo becomes equal to the sum (Vdac2+Voff). Then, the n-type transistor Q3 is turned off, and the discharge of the output condenser Co terminates.

Accordingly, the output voltage Vo is changed from the pre-instruction output voltage Vo1 to the post-instruction output voltage Vo2 as determined by the reduced instruction voltage Vdac2 in a short period of time T1, which is one $n^{th}$ of conventional time T2 (T1<<T2) with n being in the range between 1 and 100.

The offset voltage Voff is a minute voltage to compensate for the so-called under-shoot of the output voltage caused by the delaying response of operational amplifier OP3 and the n-type transistor Q3.

Without the offset voltage Voff, the output voltage Vo would once overly drops, or undershoot, below a target voltage Vo2, caused by operational delays of the operational amplifier OP3 and the n-type transistor Q3, as shown in FIG. 5(b). Then, it would take some time for the output voltage Vo to come back to the target voltage Vo2, requiring a longer time T1u, say, than T1 (T1<T1u<T2).

In order to overcome this problem, the offset voltage source 41 sets up an offset voltage Voff to take account of operational delays of the operational amplifier OP3 and the n-type transistor Q3. With a proper offset voltage Voff, the undershoot is circumvented and the target output voltage Vo2 in accord with the changed instruction voltage Vdac2 results in an extremely short period of time T1, as shown in FIGS. 4(b) and 5(a).

Figure 6:
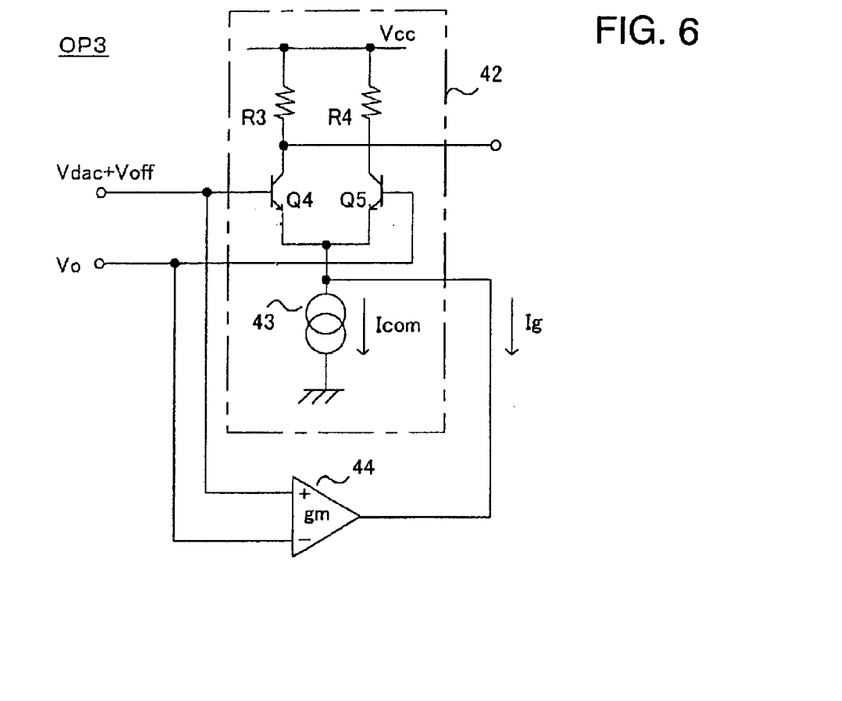
FIG. 6 shows the circuit arrangement of an operational amplifier for use in a second embodiment of a power supply unit according to the invention, in which the slewing rate of the operational amplifier is variable.
Figure 7:
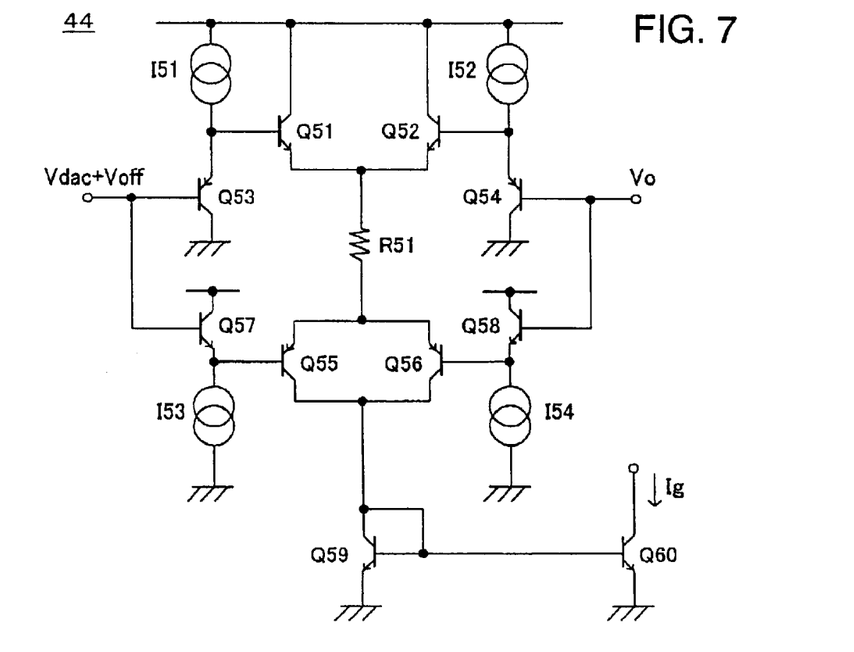
FIG. 7 shows a circuit arrangement of a GM amplifier for use in the operational amplifier FIG. 6.
Figure 8:
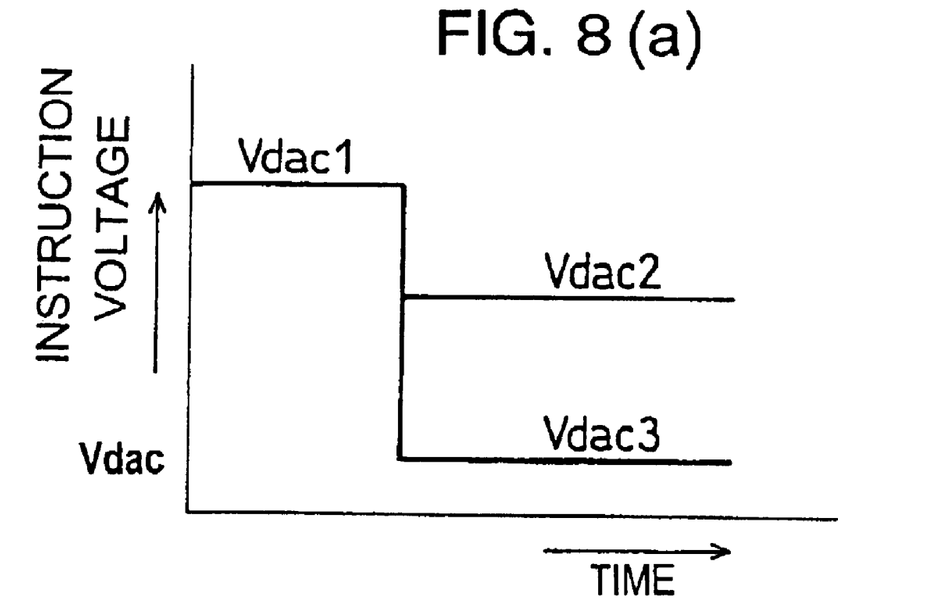
FIG. 8 shows operational characteristics of the power supply unit utilizing the operational amplifier shown in FIG. 6.

Next, referring to FIG. 6, there is shown an arrangement of an operational amplifier OP3 that allows for a variable slewing rate in accordance with a second embodiment of the invention. Slewing rate is defined to be a magnitude of rise or fall in the output per unit time for a given step-up or step-down change in the input. FIG. 7 shows a circuit diagram of a mutual conductance amplifier for use as the operational amplifier shown in FIG. 6. FIG. 8 is a graphical representation of the operations of the power supply unit utilizing the operational amplifier shown in FIG. 6.

As shown in FIG. 6, the operational amplifier OP3 has a difference amplifier 42 and a GM amplifier 44. The difference amplifier 42 is supplied with a summed voltage (Vdac+Voff) and the output voltage Vo, and amplifies the difference voltage between them.

The difference amplifier of FIG. 6 includes a first series branch consisting of a resistor R3 and an npn-type bipolar transistor (hereinafter referred to as npn transistor) Q4, a second series branch, connected in parallel with the first series branch, consisting of a resistor R4 and an npn transistor Q5, and a constant current source 43 connected in series between the first and the second series branches and the ground for supplying a constant current Icom. The base of the npn transistor Q4 is supplied with the summed voltage (Vdac+Voff), while the base of the npn transistor Q5 is supplied with the output voltage Vo.

The GM amplifier 44 is supplied with both the summed voltage (Vdac+Voff) and the output voltage Vo to output a current Ig which is proportional to the difference voltage |(Vdac+Voff)−Vo| between them. The current Ig acts to apparently increase the constant current Icom of the difference amplifier 42. Thus, the slewing rate is changed by inputting the voltage difference |(Vdac+Voff)−Vo| to vary the current supplying performance of the operational amplifier OP3.

An exemplary configuration of such GM amplifier 44 is shown in FIG. 7. In the example shown herein, the GM amplifier 44 is composed of constant current sources 151, 152, 153, and 154, npn transistors Q51, Q52, Q57, Q58, Q59, and Q60, pnp transistors Q53, Q54, Q55, and Q56, and a resistance R51, as shown.

In the GM amplifier as shown in FIG. 7, larger one of the summed voltage (Vdac+Voff) and the output voltage Vo is generated at one end of the resistor R51 (the end connected to the emitter of the npn transistor Q51), and smaller one is generated at the other end of resistance R51. As a consequence, the current Ig becomes substantially proportional to the magnitude of the difference voltage |(Vdac+Voff)−Vo| divided by the resistance of the resistor R51.

Operations of this electric power supply unit utilizing the operational amplifier OP3 having this variable slewing rate will be described with reference to FIG. 8. It should be understood that the offset voltage Voff is omitted in FIG. 8 for simplicity.

Suppose now that the power supply unit is currently in first status outputting a first (high) voltage Vo1 in accord with a first (high) instruction voltage Vdac1 until the instruction voltage Vdac is changed to a second (lower) instruction voltage Vdac2, as shown in FIG. 8(a). In this instance, the difference (Vdac2−Vo1) in voltage between the first output voltage Vo1 at the moment of the change and the changed (i.e. second) instruction voltage Vdac2 is amplified by the difference amplifier 42.

It is noted that the difference amplifier 42 is operated by the sum of the constant current Icom and the current Ig of the GM amplifier 44 associated with the difference voltage supplied to the difference amplifier 42. When the difference voltage (Vdac2−Vo1) is small, a small current Ig is added, thereby rendering the circuit to operate at a low slewing rate. In this case, the output voltage Vo changes from the first output voltage Vo to the second output voltage Vo2 after certain time T3, as shown in FIG. 8(b).

Next, consider a case where the instruction voltage Vdac is changed to a further lower third instruction voltage Vdac3 (i.e. Vdac3<Vdac2), as shown in FIG. 8(a). In this case also, the difference voltage (Vdac3−Vo1) between the third instruction voltage Vdac3 and the first output voltage Vo1 at the time of the change is amplified by the difference amplifier 42.

This time, the current Ig is increased, before it is added to the constant current Icom in accordance with an increase in the difference voltage supplied to the difference amplifier 42, thereby rendering the operational amplifier OP3 to operate at a large current. Hence, the operational amplifier OP3 is operated at a high slewing rate in accordance with a large difference voltage (Vdac3−Vo1). Thus, if a change in the instruction voltage is large, the output voltage Vo changes from the first output voltage Vo1 to the third output voltage Vo3 in substantially the same time interval T3 as shown in FIG. 8(b).

In this way, by adding an GM amplifier 44 to the difference amplifier 42, the slewing rate of operational amplifier OP3 increases with the difference of the two inputs thereof, thereby prompting the rise of the output of the operational amplifier OP3 and hence discharge of the output condenser Co.

What we claim is:

1. A power supply unit comprising:
   a power supply circuit adapted to compare an instruction voltage for setting a target output voltage with the feedback voltage associated with the output voltage of said power supply unit to generate said target output voltage;
   an output condenser connected to the output end of said power supply circuit; and
   an auxiliary output voltage setting circuit adapted to compare said instruction voltage and said feedback voltage and, when said instruction voltage is changed, to cause said output condenser to discharge its electric charge based on the comparison so that said output voltage quickly follows the changed instruction voltage.

2. The power supply unit according to claim 1, wherein said auxiliary output voltage setting circuit comprises:
   a comparator for comparing said instruction voltage and feedback voltage as two inputs; and
   a switch that is switched on by the output of said comparator, causing said output condenser to discharge.

3. The power supply unit according to claim 2, wherein either one of said two inputs is added an offset voltage having the same polarity as said instruction voltage minus said feedback voltage.

4. The power supply unit according to claim 3, wherein the slewing rate of said comparator increases with the increase of the difference between said two inputs.

5. The power supply unit according to claim 4, wherein said comparator has
   a current-driven error amplifier for amplifying the difference between said two inputs; and
   a mutual conductance amplifier for increasing the operational current of said difference amplifier in accordance with the difference between said two inputs.

6. The power supply unit according to claim 2, wherein the slewing rate of said comparator increases with the difference between said two inputs.

7. The power supply unit according to claim 6, wherein said comparator has
   a current-driven error amplifier for amplifying the difference between said two inputs; and
   a mutual conductance amplifier for increasing the operational current for said difference amplifier in accordance with the difference between said two inputs.

8. A power supply unit for supplying an output voltage, comprising:
   a switching power supply circuit having:
      series output transistors connected between a power source voltage and the ground;
      a control unit for controlling the switching operations of said output transistor based on the comparison of a feedback voltage associated with the output voltage with an instruction voltage for setting the level of said output voltage; and
      a smoothing coil having one end connected to the node of said series output transistors and another end outputting a switching output;
   an output condenser connected to the output end of said switching power supply circuit; and
   an auxiliary output voltage setting circuit adapted to compare said instruction voltage and said feedback voltage and, when said instruction voltage is changed, to cause said output condenser to discharge its electric charge based on the comparison so that said output voltage quickly follows the changed instruction voltage.

9. The power supply unit according to claim 8, wherein said auxiliary output voltage setting circuit comprises:
   a comparator for comparing said instruction voltage and feedback voltage as two inputs; and
   a switch that is switched on by the output of said comparator, causing said output condenser to discharge.

10. The power supply unit according to claim 9, wherein either one of said two inputs is added an offset voltage having the same polarity as said instruction voltage minus said feedback voltage.

11. The power supply unit according to claim 10, wherein the slewing rate of said comparator increases with the increase of the difference between said two inputs.

12. The power supply unit according to claim 11, wherein said comparator has
   a current-driven error amplifier for amplifying the difference between said two inputs; and
   a mutual conductance amplifier for increasing the operational current for said difference amplifier in accordance with the difference between said two inputs.

13. The power supply unit according to claim 9, wherein the slewing rate of said comparator increases with the increase of the difference between said two inputs.

14. The power supply unit according to claim 13, wherein said comparator has
   a current-driven error amplifier for amplifying the difference between said two inputs; and
   a mutual conductance amplifier for increasing the operational current for said difference amplifier in accordance with the difference between said two inputs.

* * * * *